United States Patent [19]

Bertus et al.

[11] Patent Number: 4,727,053

[45] Date of Patent: Feb. 23, 1988

[54] PASSIVATION OF METAL CONTAMINATED CRACKING CATALYSTS

[75] Inventors: Brent J. Bertus, Bartlesville, Okla.; Darrell W. Walker, Media, Pa.

[73] Assignee: Phillips Petroleum Company, Bartlesville, Okla.

[21] Appl. No.: 895,086

[22] Filed: Aug. 11, 1986

[51] Int. Cl.$^4$ .............................................. B01J 33/00
[52] U.S. Cl. ..................................... 502/521; 502/20; 502/22; 502/64; 502/84; 423/593; 423/617; 423/641; 208/52 CT; 208/113
[58] Field of Search ................. 502/20, 22, 521, 354, 502/344, 243; 423/593, 617, 641; 208/113, 52 CT

[56] References Cited

U.S. PATENT DOCUMENTS

| | | | |
|---|---|---|---|
| 2,981,676 | 4/1961 | Adams et al. | 208/120 |
| 3,236,904 | 2/1966 | Pickert | 585/485 |
| 3,415,736 | 12/1968 | Ciric | 208/111 |
| 4,025,458 | 5/1977 | McKay | 208/48 AA |
| 4,141,858 | 2/1979 | McKay | 208/120 |
| 4,178,267 | 12/1979 | McKay | 502/31 |
| 4,244,810 | 1/1981 | Youngblood et al. | 208/120 |
| 4,256,564 | 3/1981 | Roberts et al. | 502/20 |
| 4,263,131 | 4/1981 | Bertus et al. | 502/20 |
| 4,331,563 | 5/1982 | McKay | 208/120 |
| 4,364,847 | 12/1982 | Tu | 208/120 |
| 4,411,777 | 10/1983 | McKay | 208/120 |
| 4,451,355 | 5/1984 | Mitchell et al. | 502/521 |
| 4,495,064 | 1/1985 | Boston | 208/120 |
| 4,562,167 | 12/1985 | Bertus et al. | 502/521 |
| 4,584,283 | 4/1986 | Bertus et al. | 208/120 |
| 4,603,117 | 7/1986 | Sato et al. | 502/64 |

FOREIGN PATENT DOCUMENTS 1570682 7/1980 United Kingdom ............... 208/120

Primary Examiner—Patrick P. Garvin
Assistant Examiner—Anthony McFarlane
Attorney, Agent, or Firm—Paul S. Chirgott

[57] ABSTRACT

A novel cracking catalyst, a method of preparing same and an improved hydrocarbon cracking process are provided wherein adverse effects of metals such as nickel, vanadium, iron, copper and cobalt in the cracking catalyst are precluded or mitigated by contacting the cracking catalyst with an antimony treating agent comprising at least one of elemental antimony and compounds thereof and a lithium treating agent comprising at least one of elemental lithium and compounds thereof whereby there is added to said catalyst a modifying amount of each antimony treating agent and lithium treating agent with the weight ratio of antimony to lithium being such as to provide passivation of contaminating metals greater than the sum of the passivation effect of each of antimony treating agent and lithium treating agent individually.

22 Claims, No Drawings

PASSIVATION OF METAL CONTAMINATED CRACKING CATALYSTS

The present invention relates to the art of catalytic cracking of hydrocarbons. More specifically, the invention relates to the restoration of cracking catalysts which have contacted a hydrocarbon feedstock. Particularly, the invention relates to the passivation of contaminating metals, deposited onto cracking catalysts which have contacted a hydrocarbon feedstock, through the use of passivating agents.

BACKGROUND OF THE INVENTION

Fossil fuels are one of the world's leading sources of energy. However, these fuels are being irreversibly depleted at a more rapid rate than they were initially formed. Thus, there exists a continual need to derive newer and more efficient processes for converting crude oils into useable petroleum products.

The rising demand for oil and oil by-products has lead to the conversion of higher molecular weight crude oils into these desired products. One method of accomplishing this conversion process is by reducing the molecular weight of these heavy crude oils. One principle method utilized in reducing the molecular weight of hydrocarbons is referred to as "catalytic cracking". Generally, with this method, hydrocarbon feedstocks containing higher molecular weight hydrocarbons have their molecular weight reduced (i.e. "cracked") by being contacted under elevated temperatures with a cracking catalyst whereby producing light distillates such as gasoline.

In the catalytic cracking of hydrocarbon feedstocks, particularly heavy feedstocks, metals such as nickel, vanadium, iron, copper and/or cobalt present in the feedstocks become deposited on the cracking catalyst promoting excessive hydrogen and coke formations. Since the production of hydrogen and coke is inversely proportional to the production of usable by-products, these are undesirable products of a cracking process. Furthermore, although the cracking catalyst does undergo a regeneration process, the metal contaminants, which cause the excessive formation of hydrogen and coke, are not removed by conventional catalyst regeneration operation. Therefore, there exists a need to remove contaminating metals from cracking catalysts.

One method of removing part of the effects of these contaminating metals is through a process called metals passivation. As used hereinafter, the term "passivation" is defined as a method for decreasing the detrimental catalytic effects of metal contaminants such as nickel, vanadium, iron, copper and/or cobalt which become deposited on the cracking catalyst. Therefore, by passivating the contaminating metal deposits on cracking catalysts, the catalysts' life and desired product yields can be prolonged and increased respectively.

It is known that some of the metal deposits, which contaminate cracking catalysts, can be passivated to some degree by contacting the contaminated catalyst with various metal passivating compounds. One method of carrying out this process is by dispersing the selected metal passivating agent either directly into the hydrocarbon cracking reactor or into the hydrocarbon feed stream. Although there are many compounds which can, to some degree, passivate contaminating metal deposits, there is always a need for new, improved metal passivating agents. Therefore, it is an object of this invention to provide a metals passivation process which utilizes new, improved passivating agents.

Due to the increasing demand, of a limited supply of petroleum and other related products, if it were possible to increase the degree of converting higher molecular weight hydrocarbons to lighter distillates such as gasoline, by increasing the degree of passivating metal deposits, a substantial improvement in the art would be afforded. Thus, a further object of this invention is to provide novel, improved passivating agents for cracking catalysts.

Still a further object of this invention is to provide a modified cracking catalyst which provides high product yields and selectivity for gasoline and/or other higher-boiling hydrocarbon fuel.

Further objects, embodiments, advantages, features and details of this invention will become apparent to those skilled in the art from the following detailed description of the invention and the appended claims.

SUMMARY OF THE INVENTION

This invention provides, among other things, an improved catalytic cracking process wherein adverse affects of metals, such as nickel, vanadium, iron, copper and/or cobalt in or on the cracking catalyst, are precluded or mitigated by contacting the cracking catalyst during the catalytic cracking process or by modifying the cracking catalyst prior to the catalytic cracking process, with a novel passivating agent comprising an antimony treating agent and a lithium treating agent. This novel passivating agent is added to the cracking catalyst in such a modifying amount and weight ratio of antimony to lithium, whereby the affect of passivation of the contaminating metals is greater than the sum of the passivating effects of each of antimony and lithium individually.

DETAILED DESCRIPTION OF THE INVENTION

In accordance with this disclosure, the term "cracking catalyst" refers to any cracking catalytic materials which may be useful for cracking hydrocarbons. In practicing this invention, any suitable cracking catalyst may be utilized. The term "modified cracking catalyst" as used herein refers to any cracking catalyst which has been modified by being contacted with any metal passivating agent either prior to or during the catalytic cracking process.

Moreover, "conventional cracking catalysts" is disclosed herein can be any of those cracking catalysts employed in the catalytic cracking of hydrocarbons which have a boiling point above 400° F. (204° C.), for the production of by-products including, but not limited to, gasoline, motor fuel, blending components and other light distillates. These conventional cracking catalysts generally contain silica or silica-alumina. Such conventional cracking catalysts are frequently associated with zeolitic materials. These zeolitic materials can be naturally occurring, or they can be produced by conventional ion exchange methods such as to provide metallic ions which improve the activity of the catalyst. Zeolite-modified silica-alumina catalysts are particularly applicable in this invention.

If desired, the cracking catalyst can contain a combustion promoter such as platinum or chromium.

The term "used cracking catalyst" as used herein refers to a hydrocarbon cracking catalyst which has contacted the hydrocarbon feedstock and, thus, contains contaminating metals therein or thereon. Conversely, the "unused hydrocarbon cracking catalyst" as employed in the present invention, since it has not yet contacted the hydrocarbon feed, should contain essentially no contaminating metals such as nickel, vanadium, iron, copper and/or cobalt. Particularly and preferably, the nickel, vanadium, iron, and copper metals content of the unused catalytic cracking material which constitutes the major portion of the unused cracking catalyst of this invention is defined by the following limits:

| Metal | Metal Content of Unused Catalyst in Weight Percent |
| --- | --- |
| Nickel | 0 to 0.02 |
| Vanadium | 0 to 0.06 |
| Iron | 0 to 0.80 |
| Copper | 0 to 0.02 |

The weight percentage limits of the above table relate to the total weight of the unused catalytic cracking material including the metals nickel, vanadium, iron and/or copper, but excluding the added passivating agent which would modify the cracking catalyst. The contents of these metals on the cracking catalyst can be determined by standard methods well known in the art.

Since one of the main purposes of the novel passivating agents of this invention is to prevent or mitigate the otherwise occurring undesirable affects of contaminating metals, the sources of antimony and lithium utilized and incorporated into or onto the cracking catalyst should be essentially free of such contaminating metals. Thus, the antimony and lithium sources used in practicing this invention should essentially contain no nickel, no vanadium, no iron, no copper and no cobalt or any other detrimental contaminating metal.

In accordance with this invention, the adverse effects of contaminating metals including, but not limited to, nickel, vanadium, iron, copper and/or cobalt or other similar contaminating metals on cracking catalysts are precluded or mitigated by contacting the cracking catalyst with a passivating agent comprising an antimony treating agent and a lithium treating agent. When incorporated in a conventional catalytic cracking process, this novel passivating agent will provide at least one improvement to the cracking process such as an increase in catalyst activity, an increase in yield of liquid fuels, a reduction in the production of coke and a reduction in the production of hydrogen.

The form in which antimony is present in or on the cracking catalyst or is employed in the preparation of the antimony/lithium-containing cracking catalyst is not critical. Any suitable form of antimony which provides at least some degree of passivation of contaminating metals deposited on a cracking catalyst can be utilized. Thus, elemental antimony, inorganic antimony compounds, and organic antimony compounds, as well as mixtures of any two or more of the above, are suitable sources of antimony.

Generally, the term "antimony", as used in this disclosure, refers to any suitable antimony source. Examples of some inorganic antimony compounds which can be used include, but are not limited to, antimony oxides such as antimony trioxide, antimony tetroxide and antimony pentoxide; antimony sulfides such as antimony trisulfide and antimony pentasulfide; antimony selenides, such as antimony triselenide; antimony teluerides such as antimony trituride; antimony sulfates such as antimony trisulfate; antimonic acids such as metaantimonic acid, orthoantimonic acid and pyroantimonic acid; antimony halides such as antimony trifluoride, antimony trichloride, antimony tribromide, antimony triiodide, antimony pentafluoride and antimony pentachloride; antimonyl halides such as antimony chloride and antimonial trichloride; antimonides such as indium antimonide; and the like. Furthermore, organic polymers containing antimony can be employed as the organic antimony compound. In addition to carbon and hydrogen, the organic antimony compound can contain elements such as oxygen, sulfur, nitrogen, phosphorus or the like. Examples of some organic antimony compounds which can be used in the preparation of the novel passivating agent provided in this invention include, but are not limited to, antimony carboxylates such as antimony triformate, antimony trioctoate, antimony triacetate, antimony tridodecanoate, antimony trioctadecanoate, antimony tribenzoate, and antimony tris(cyclohexanecarboxylate); antimony thiocarboxylates such as antimony tris(thioacetate), antimony tris(dithioacetate) and antimony tris(dithiopentanoate); antimony thiocarbonates such as antimony tris((O-propyl dithiocarbonate); antimony carbonates such as antimony tris(ethyl carbonate); trihydrocarbylantimony compounds such as triphenylantimony; trihydrocarbylantimony oxides such as triphenylantimony oxide; antimony salts of phenolic compounds such as antimony triphenoxide; antimony salts of thiophenolic compounds such as antimony tris(thiophenoxide); antimony sulfonates such as antimony tris(benzenesulfonate) and antimony tris(p-toluenesulfonate); antimony carbamates such as antimony tris(diethylcarbamate); antimony thiocarbamates such as antimony tris(dipropyldithiocarbamate), antimony tris(phenyldithiocarbamate) and antimony tris(butylthiocarbamate); antimony phosphites such as antimony tris(diphenyl phosphite); antimony phosphates such as antimony tris(dipropyl phosphate); antimony thiophosphates such as antimony tris(O,O-dipropyl thiophosphate) and antimony tris(O,O-dipropyl dithiophosphate) and the like. Mixtures of any two or more applicable substances comprising antimony can be employed. Generally, the antimony compound comprises antimony oxide compounds. Preferably, antimony compound comprises antimony trioxide.

As used herein, the term "antimony treating agent" is intended to include elemental antimony or a compound thereof as described above.

The form in which lithium is present in or on the cracking catalyst or is employed in the preparation of the antimony/lithium-containing cracking catalyst is also not critical. Any suitable form of lithium which, when combined with an antimony compound promotes the passivation affects of either component separately, can be employed. Thus, elemental lithium, inorganic lithium compounds and organic lithium compounds, as well as mixture thereof, are suitable sources of lithium.

Generally, the term "lithium", as used in this disclosure, refers to any suitable lithium source. Examples of some lithium compounds which can be used include, but are not limited to, lithium metal, lithium acetate, lithium benzoate, lithium nitrate, lithium carbonate, lithium hydroxide, lithium oxide, n-butyl lithium, lithium butoxide, lithium diphenylphosphide or any lithium compound convertable to the oxide. Mixtures of any two or more applicable substances comprising lithium can be employed. Preferably the hydrocarbon soluble form of lithium may be used. More preferably n-butyl lithium can be used.

As used herein, the term "lithium treating agent" is intended to include elemental lithium or a compound thereof as explained above.

Any suitable weight ratio of antimony to lithium which provides passivation of contaminating metals can be used. In general, this ratio of antimony compound to lithium compound will be wherein the range of from about 4:1 to about 0.25:1, and preferably, in the range of from about 2:1 to about 0.50:1.

Any suitable concentration of passivating agent may be used. In general, the antimony will be present in such amount as to provide a concentration of antimony in the range from about 0.05 to about 0.50, and preferably, in the range from about 0.10 to about 0.20 weight-percent, of antimony in or on the cracking catalyst, this percentage being based on the weight of cracking catalyst prior to treatment with the passivating agent. Similarly, the lithium will generally be present in such amount as to provide a concentration of lithium in the range from about 0.03 to about 0.50, and preferably in the range from about 0.07 to about 0.20 weight-percent, based on the weight of the cracking catalyst prior to treatment with the passivating agent of this invention. The amount of antimony and lithium which is most desirable in or on the cracking catalyst will vary according to the effective level of contaminating metals on the catalyst, with higher values of antimony and lithium being desired for higher effective values of contaminating metals.

The novel passivating agent of this invention may contact the catalytic cracking material in any suitable manner. As previously stated, it is conventional to add the passivating agent to the hydrocarbon feed stream or directly into the catalytic cracking reactor. Also, the passivating agent may be added to the unused catalytic cracking material before such material is charged to the catalytic cracking process. However, since the addition of a passivating agent is well known and the method of addition does not play a part in this present invention, methods of addition of the passivating agent will not be discussed more fully hereinafter except for the preferred method.

In the preferred embodiment of this invention, the antimony treating agent and the lithium treating agent, in admixture or separately, are added to the oil feedstock, as the feedstock is charged to the catalytic cracking reactor. As described earlier, these treating agents are added at such a rate as to maintain the concentration of antimony and lithium in or on the cracking catalyst within any suitable range of weight percentage which would result in the enhanced passivation of contaminating metals.

The time during which the contaminated cracking catalyst is contacted with the novel passivating agent is not critical. Generally, the time for a batch treatment of the contaminated cracking catalyst, outside of the reaction, is in the range from about 1 to about 60 minutes.

In accordance with another embodiment, this invention provides a novel modified cracking catalyst which has been prepared by contacting a conventional cracking catalyst with a modifying amount of both an antimony treating agent and a lithium treating agent as described herein.

The antimony/lithium-containing cracking catalyst can be prepared by any suitable method. Generally, the modified cracking catalyst is prepared by contacting a conventional catalytic cracking material with an admixture comprising an antimony treating agent and a lithium treating agent, or the conventional cracking catalyst can be contacted with the antimony treating agent and the lithium treating individually, in separate steps, with or without an intermediate step such as heating or dilutent removal. Thus, the conventional cracking catalyst can be contacted with both treating agents at the same time or first with either treating agent and then with the other.

Prior to or during use in the cracking process, the antimony/lithium-containing cracking catalyst is heated to an elevated temperature. This temperature is generally within the range of about 800° F. to about 1500° F., in either an oxidizing or reducing atmosphere. Such heating can occur by any suitable means. Generally such heating occurs in the catalytic cracking reactor.

The cracking process, in which the novel modified cracking catalyst is employed, is basically an improvement over a conventional cracking process which employs a conventional cracking catalyst alone or as modified by either antimony or lithium alone. Although the modified cracking catalyst can be employed in a catalytic cracking process employing a fixed catalyst bed, it is also useful in a fluid catalytic cracking (FCC) process.

The embodiments of this invention are applicable to any suitable conventional hydrocarbon cracking units using conventional hydrocarbon cracking catalysts. Such conventional cracking operations are generally carried out at temperatures between 800° F. and about 1500° F. at pressures within the range of sub-atmospheric to approximately 50 psi. An example of a suitable conventional hydrocarbon cracking unit for carrying out the objects of this invention is a fluid catalytic cracking unit (FCCU) which is generally made up of a hydrocarbon cracking reactor, a cracking catalyst regenerator and a fractionator.

Furthermore, a preferred embodiment of this invention is described in terms of a FCCU in which gas oil is utilized as the hydrocarbon feedstock and the primary objective of the particular unit is to produce gasoline. However, other hydrocarbon feedstocks may be utilized and the most desired product may be something other than gasoline. This embodiment of the invention is also described in terms of supplying air to the cracking catalyst regenerator which supplies the oxygen required to burn off carbon (i.e. coke) from the used cracking catalyst. While air is generally the source of oxygen to the cracking catalyst regenerator, any suitable source of free oxygen may be utilized.

It is preferred, when carrying out the cracking process of this invention, to replace a fraction of the total cracking catalyst with unused cracking catalysts either continuously or intermittently. Conventionally, part of the cracking catalyst is replaced daily by fresh unused cracking catalyst. The actual quantity of catalyst replaced depends in part upon the nature of the feedstock used and the efficiency of the cracking unit. This make-up quantity of unused cracking catalyst can be added at any suitable location in the cracking process. Generally, the make-up catalyst is introduced into the catalyst regeneration cycle. Preferably, the make-up catalyst is dispersed directly into the catalyst regenerator.

Also, it is to be understood that the used cracking catalyst, coming from the cracking zone, before introduction into the regenerator, is stripped of essentially all entrained liquid or gaseous hydrocarbons. Similarly, the regenerated catalyst can be stripped of any entrained oxygen before it reenters the cracking zone. The stripping process may be accomplished by any suitable means. Generally, the stripping is done with steam.

The specific conditions in the cracking zone and in the regeneration zone are not critical and depend upon several parameters such as the feedstock used, the catalyst used, and the results desired. Preferably and most commonly, however, the cracking and regeneration conditions are within the following ranges:

| Cracking Zone | |
|---|---|
| Temperature | 800°–1200° F. (427°–649° C.) |
| Time | 1–40 seconds |
| Pressure | Sub-atmospheric to 3000 psig |
| Catalyst:oil ratio | 3:1 to 30:1. by weight |
| Regeneration Zone | |
| Temperature | 1000°–1500° F. (538°–816° C.) |
| Time | 2–40 minutes |
| Pressure | Sub-atmospheric to 3000 psig |
| Air at 60° F. (16° C.) and 1 atmosphere: | 100–250 ft$^3$/lb. coke (6.2–15.6 m$^3$/kg coke) |

The feedstocks employed in the catalytic cracking process of this invention contain metal contaminants such as nickel, vanadium, iron, copper and/or cobalt and the like. The feedstocks include, but are not limited to, those which are conventionally utilized in catalytic cracking processes to produce gasoline and light distillate fractions from heavier hydrocarbon feedstocks. The feedstocks generally have an initial boiling point above about 400° F. (204° C.) and include, but are not limited to, fluids such as gas oils, fuel oils, cycle oils, slurry oils, topped crudes, shell oils, oils from tar sands, oils from coal, mixtures of two or more of these, and the like. The term "topped crudes" as used herein refers to those oils which are obtained as the bottoms of a crude oil fractionator. If desired, all or a portion of the feedstock can constitute an oil from which a portion of the metal content previously has been removed. Typically, the feedstock used in the process of this invention will contain one or more of the metals nickel, vanadium and iron within the ranges shown in the following table:

| Metal | Metal Content of Feedstocks, ppm[1] |
|---|---|
| Nickel | 0.02 to 100 |
| Vanadium | 0.02 to 500 |
| Iron | 0.02 to 500 |
| Total metals[2] | 0.2 to 100 |

[1]The ppm metal content refers to the feedstock as used. As used in this table and throughout the specification, "ppm" means parts per million, by weight.
[2]"Total metals" in this table and elsewhere refers to the sum of the nickel, vanadium and iron contents in the feedstock that are effective in contaminating the catalyst; the total metals content can be determined in accordance with methods well known in the art, e.g., by atomic absorption spectroscopy.

An important embodiment of this invention resides in a heavy oil cracking process. In conventional heavy oil cracking processes, it is possible to crack heavy oils having a metal content up to about 80 ppm of total effective metals, i.e., metals in any form detrimental to the cracking process. Economically, marginal results are obtained with oils having 40 to about 80 ppm of total effective metals. However, in accordance with this invention, heavy oils with a total metals content of about 40 to about 100 ppm and even those of about 100 to about 200 ppm of total metals can be cracked in the absence of added hydrogen, by utilizing the modified cracked catalyst defined above, to yield gasoline and other fuels and fuel blending components. Thus, known heavy oils with total metal contents of about 80 to about 300 ppm, that heretofore could not be directly used for fuel production and in particular for gasoline or higher boiling hydrocarbon fuels production, in accordance with invention, can be cracked to yield gasoline and other higher-boiling hydrocarbon fuels including, but not limited to, kerosene, diesel fuel and burning oils.

Any suitable concentration of antimony plus lithium in or on the antimony/lithium-containing cracking catalyst may be used in the process of this invention for cracking these heavily metal-loaded oils. Generally, the concentration of antimony plus lithium is related to the average total effective metals content of the feedstock. Preferably, the concentration of antimony plus lithium, for a given concentration of total effective metals in the feedstock is shown in the following table:

| Total Effective Metals[2] in Feedstock (ppm) | Antimony + Lithium Concentration[1] in Catalyst, Weight % |
|---|---|
| <1–40 | 0.0001–0.6 |
| 40–100 | 0.05–0.8 |
| 100–200 | 0.1–1 |
| 200–300 | 0.15–1.5 |
| 300–800 | 0.2–2 |

[1]Concentration is based on the weight of the catalyst prior to addition of the antimony and lithium-containing treating agents.
[2]"Total Effective Metals" as used herein means the sum of the vanadium concentration, the catalytic iron concentration, four times the nickel concentration, four times the copper concentration, and the products of the concentration of any other contaminating metals and their respective relative activity.

The invention will still more fully be understood from the following examples, which are intended to illustrate preferred embodiments of the invention but, in no way, are intended to limit the scope thereof.

EXAMPLE I

A commercial equilibrium cracking catalyst comprising amorphous silica-alumina associated with zeolitic material, which had been used in a commercial cracking unit and subsequently subjected to regeneration was employed in a series of tests which demonstrated the effectiveness of antimony and lithium together in improving the activity of a metal-contaminated hydrocarbon cracking catalyst. The catalyst regeneration was accomplished by heating the catalyst, while fluidized, with air to 1250° F. and maintaining the catalyst at that temperature for approximately 30 minutes. Properties of this equilibrium catalyst are shown in Table I.

TABLE I

| Surface Area (m$_2$/g) | 74.30 |
|---|---|
| Pore Volume (ml/g) | 0.29 |
| Composition (Weight %): | |
| Silicon | 24.60 |
| Aluminum | 21.70 |
| Iron | 0.90 |
| Vanadium | 0.60 |
| Cerium | 0.40 |
| Sodium | 0.39 |
| Nickel | 0.38 |
| Carbon | 0.06 |
| Antimony | 0.02 |

The cracking catalyst having the properties shown in Table I, is designated as "Catalyst 1".

A second commercial equilibrium cracking catalyst, comprising amorphous silica-alumina associated with zeolitic material, which had also been used in the same commercial cracking unit and subjected to the same manner of regeneration as Catalyst 1, was obtained which further comprised 0.13 parts by weight antimony per 100 parts by weight of this equilibrium catalyst. Properties of this equilibrium catalyst are shown in Table II.

TABLE II

| | |
|---|---|
| Surface Area (m₂/g) | 76.40 |
| Pore Volume (ml/g) | 0.30 |
| Composition (Weight %): | |
| Iron | 0.82 |
| Vanadium | 0.45 |
| Carbon | 0.41 |
| Hydrogen | 0.35 |
| Phosphorous | 0.25 |
| Nickel | 0.22 |
| Antimony | 0.13 |
| Sulfur | 0.07 |

The cracking catalyst having the properties shown in Table II is designated as "Catalyst 2".

A third catalyst containing 0.07 part by weight lithium per 100 parts by weight of that catalyst was prepared. This catalyst was prepared by impregnating 50 grams of Catalyst 1 with 50.4 ml of a cyclohexane solution containing 0.035 grams of lithium. The cyclohexane solvent was removed by being stripped off with nitrogen. Properties of this catalyst are shown in Table III.

TABLE III

| | |
|---|---|
| Surface Area (m₂/g) | 74.30 |
| Pore Volume (ml/g) | 0.29 |
| Composition (Weight %): | |
| Silicon | 24.60 |
| Aluminum | 21.70 |
| Iron | 0.90 |
| Vanadium | 0.60 |
| Cerium | 0.40 |
| Sodium | 0.39 |
| Nickel | 0.38 |
| Lithium | 0.07 |
| Carbon | 0.06 |
| Antimony | 0.02 |

The cracking catatlyst having the properties shown in Table III is designated as "Catalyst 3".

A third portion of Catalyst 1 was used in the preparation of catalyst composition. A fourth catalyst containing 0.13 part by weight antimony and 0.07 part by weight lithium per 100 parts by weight of that catalyst was prepared. This catalyst was prepared by impregnating 50 grams of Catalyst 2 with 50.4 ml cyclohexane solution containing 0.035 grams of lithium. The cyclohexane solvent was removed by being stripped off with nitrogen. Properties of this catalyst are shown in Table IV.

TABLE IV

| | |
|---|---|
| Surface Area (m₂/g) | 80.90 |
| Pore Volume (ml/g) | 0.30 |
| Composition (Weight %): | |
| Iron | 0.78 |
| Vanadium | 0.44 |
| Carbon | 0.41 |
| Hydrogen | 0.35 |
| Phosphorous | 0.25 |
| Nickel | 0.22 |
| Antimony | 0.13 |
| Lithium | 0.07 |
| Sulfur | 0.07 |

The cracking catalyst having the properties shown in Table IV is designated as "Catalyst 4".

Catalysts 1, 2, 3 and 4 were evaluated in a series of cracking regneration cycles using topped crude oil from Borger, Tex. as the feedstock in the cracking step. Except as otherwise noted, in each cycle, the cracking step was carried out at about 950° F. and about atmospheric pressure for 0.5 minute, and the regeneration step was conducted at about 1250° F. and about atmospheric pressure for approximately 30 minutes. To insure consistency in the results, the reactor was purged with nitrogen before and after each cracking step.

The properties of the topped Borger, Tex. crude oil used in the cracking steps of this example are shown in the following table:

TABLE V

| Feed | | |
|---|---|---|
| API gravity | 21.1 | |
| Carbon residue, Conradson | 5.41 | |
| Elemental analysis: | | |
| Sulfur | 1.2 | wt % |
| Nitrogen | 0.18 | wt % |
| Nickel | 6.9 | ppm |
| Vanadium | 12.5 | ppm |
| Iron | 1.9 | ppm |
| Viscosity cst @ 100° C. | 30.3 | |

The results from the cracking tests when using Catalysts 1, 2, 3 and 4 are summarized in Table IV.

TABLE VI

| | Elements Added Wt. % Added | | Catalyst:Oil | Yield | | | |
|---|---|---|---|---|---|---|---|
| | | | | Conversion | Gasoline | Coke | H₂ SCF/bbl |
| Catalyst | Antimony | Lithium | Wt. Ratio | Vol. % of Feed | Vol. % of Feed | Wt. % of Feed | Feed Converted |
| 1 | 0 | 0 | 7.04 | 80.3 | 56.45 | 16.0 | 869 |
| 1 | 0 | 0 | 6.99 | 78.7 | 55.80 | 16.1 | 955 |
| Averages for Catalyst 1: | | | 7.02 | 79.5 | 56.13 | 16.05 | 912 |
| 2 | 0.13 | 0 | 7.03 | 80.30 | 56.45 | 15.17 | 224 |
| 2 | 0.13 | 0 | 7.10 | 83.08 | 53.79 | 15.65 | 252 |
| 2 | 0.13 | 0 | 7.03 | 82.63 | 56.75 | 16.35 | 291 |
| 2 | 0.13 | 0 | 7.02 | 83.39 | 54.77 | 16.03 | 342 |
| 2 | 0.13 | 0 | 7.03 | 82.71 | 55.05 | 16.31 | 289 |
| Averages for Catalyst 2: | | | 7.04 | 82.42 | 55.36 | 15.90 | 320 |
| 3 | 0 | 0.07 | 7.01 | 76.5 | 52.9 | 16.2 | 988 |
| 3 | 0 | 0.07 | 7.04 | 76.2 | 53.0 | 16.5 | 1054 |
| 3 | 0 | 0.07 | 7.04 | 77.6 | 55.3 | 16.2 | 1061 |
| Averages for Catalyst 3: | | | 7.03 | 76.77 | 53.73 | 16.3 | 1034 |
| 4 | 0.13 | 0.07 | 7.01 | 83.68 | 57.56 | 15.49 | 315 |
| 4 | 0.13 | 0.07 | 7.01 | 83.28 | 57.53 | 14.47 | 319 |
| 4 | 0.13 | 0.07 | 7.08 | 83.32 | 59.25 | 16.42 | 298 |
| 4 | 0.13 | 0.07 | 7.00 | 83.47 | 58.54 | 15.56 | 299 |

TABLE VI-continued

| | Elements Added Wt. % Added | | Catalyst:Oil Wt. Ratio | Yield | | | |
|---|---|---|---|---|---|---|---|
| | | | | Conversion Vol. % | Gasoline Vol. % | Coke Wt. % | $H_2$ SCF/bbl Feed |
| Catalyst | Antimony | Lithium | | of Feed | of Feed | of Feed | Converted |
| Averages for Catalyst 4: | | | 7.03 | 83.44 | 58.22 | 15.49 | 308 |

As indicated in Table VI, in each of the cracking tests in which the catalyst used was modified with both antimony and lithium (i.e., Catalyst 4), the catalyst performed much better than the catalysts which were modified with only lithium (i.e., Catalyst 3) or only antimony (i.e., Catalyst 2). When comparing the results between an unmodified Catalyst (i.e. Catalyst 1) and a catalyst modified with lithium only (i.e., Catalyst 3), it is observed that lithium reduces both the conversion of feed to usable product and the conversion of feed to gasoline while, at the same time, increasing both the production of coke and hydrogen. All of these above effects of lithium on a cracking catalyst are undesirable. Therefore, the expected results of combining antimony with lithium would be that of decreasing the effectiveness of the cracking catalyst when compared with a catalyst which was modified only by antimony. This, however, is not the case. When comparing the results of a catalyst modified only with antimony (i.e., Catalyst 2) and a catalyst modified with both antimony and lithium (i.e., Catalyst 4), it is observed that the combination of antimony with lithium increases the percentage of feedstock converted to useful by-products by 1.22%; increases the percentage of feed converted to gasoline by 4.91%; decrease the percentage of feed converted to coke by 2.65%; and decreases the percentage of the percentage of feed converted to $H_2$ by 3.90%. Therefore, this example illustrates that this invention represents a significant improvement for the catalytic cracking process of hydrocarbon feedstocks by providing highly desired yet unexpected results.

Reasonable variations and modifications which will be apparent to those skilled in the art can be made in this invention without departing from the spirit and the scope thereof.

That which is claimed is:

1. A cracking catalyst composition which comprises a cracking catalyst having in combination therewith a passivating agent comprising an antimony treating agent and a lithium treating agent, wherein said lithium treating agent is present in an amount which is greater than about 0.03 but less than about 0.50 weight percent, said weight percent being based on the weight of the cracking catalyst prior to addition of said antimony treating agent and said lithium treating agent.

2. A composition in accordance with claim 1 wherein said cracking catalyst is a used cracking catalyst having a deactivating amount of one or more of the metals nickel, iron and vanadium deposited thereon.

3. A composition in accordance with claim 1 wherein said antimony treating agent has been added to said cracking catalyst in the form of at least one organic antimony compound and wherein said lithium treating agent has been added to said cracking catalyst in a form of at least one organic lithium compound.

4. A composition in accordance with claim 1 wherein said cracking catalyst is a fresh cracking catalyst.

5. A composition in accordance with claim 2 wherein said cracking catalyst is a mixture of said used cracking catalyst and a fresh cracking catalyst.

6. A composition in accordance with claim 1 wherein said antimony treating agent is present in the amount in the range from about 0.05 to about 0.50 weight percent, wherein said weight percent being based on the weight of said cracking catalyst prior to addition of said antimony treating agent and said lithium treating agent.

7. A composition in accordance with claim 6 wherein said antimony treating agent is present in the amount in the range from about 0.10 to about 0.20 weight percent, and said lithium treating agent is present in the amount in the range from about 0.07 to about 0.20 weight percent, said weight percent being based on the weight of said cracking catalyst prior to addition of said antimony treating agent and said lithium treating agent.

8. A composition in accordance with claim 1 wherein the weight ratio of said antimony treating agent to said lithium treating agent is in the range from about 4:1 to about 0.25:1.

9. A composition in accordance with claim 8 wherein the weight ratio of said antimony treating agent to said lithium treating agent is in the range from about 2:1 to about 0.50:1.

10. A composition in accordance with claim 1 wherein said antimony treating agent is selected from the group consisting of antimony oxides.

11. A composition in accordance with claim 10 wherein said antimony treating agent is antimony trioxide.

12. A composition in accordance with claim 1 wherein said lithium treating agent is selected from the group consisting of lithium metal, lithium acetate, lithium benzoate, lithium nitrate, lithium carbonate, lithium hydroxide, lithium oxide, n-butyl lithium, lithium butoxide and lithium diphenylphosphide.

13. A composition in accordance with claim 12 wherein said lithium treating agent is n-butyl lithium.

14. A metals passivating agent comprising an antimony treating agent and a lithium treating agent, wherein the weight ratio of said antimony treating agent to said lithium treating agent is in the range from about 4:1 to about 0.25:1.

15. A composition in accordance with claim 14 wherein the weight ratio of said antimony treating agent to said lithium treating agent is in the range from about 2:1 to about 0.50:1.

16. A composition in accordance with claim 14 wherein said antimony treating agent is selected from the group consisting of antimony oxides.

17. A composition in accordance with claim 16 wherein said antimony treating agent is antimony trioxide.

18. A composition in accordance with claim 14 wherein said lithium treating agent is selected from the group consisting essentially of lithium metal, lithium acitate, lithium benzoate, lithium nitrate, lithium carbonate, lithium hydroxide, lithium oxide, n-butyl lithium, lithium butoxide and lithium diphenylphosphide.

19. A composition in accordance with claim 18 wherein said lithium treating agent is n-butyl lithium.

20. A composition in accordance with claim 18 wherein said antimony treating agent is selected from the group consisting of antimony oxides.

21. A composition in accordance with claim 20 wherein said antimony treating agent comprises antimony trioxide.

22. A composition in accordance with claim 21 wherein said lithium treating agent is n-butyl lithium.

* * * * *